July 20, 1954  B. CERESA  2,684,265
AUTOMOBILE TRUNK VENTILATING DEVICE
Filed Aug. 8, 1952  2 Sheets-Sheet 1

INVENTOR.
BRUNO CERESA,
BY
McMorrow, Berman & Davidson
ATTORNEYS.

July 20, 1954    B. CERESA    2,684,265
AUTOMOBILE TRUNK VENTILATING DEVICE
Filed Aug. 8, 1952    2 Sheets-Sheet 2
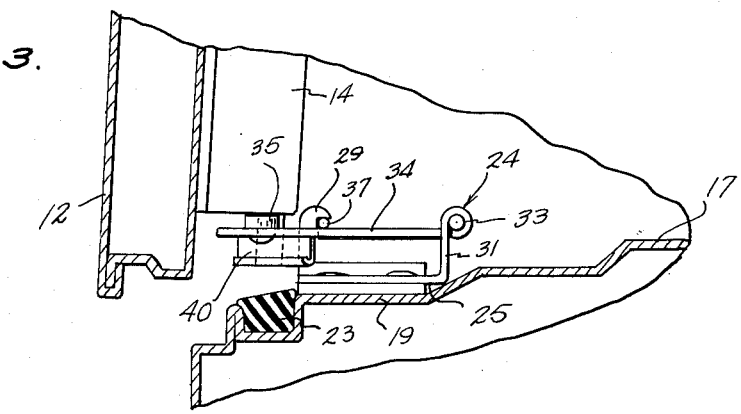
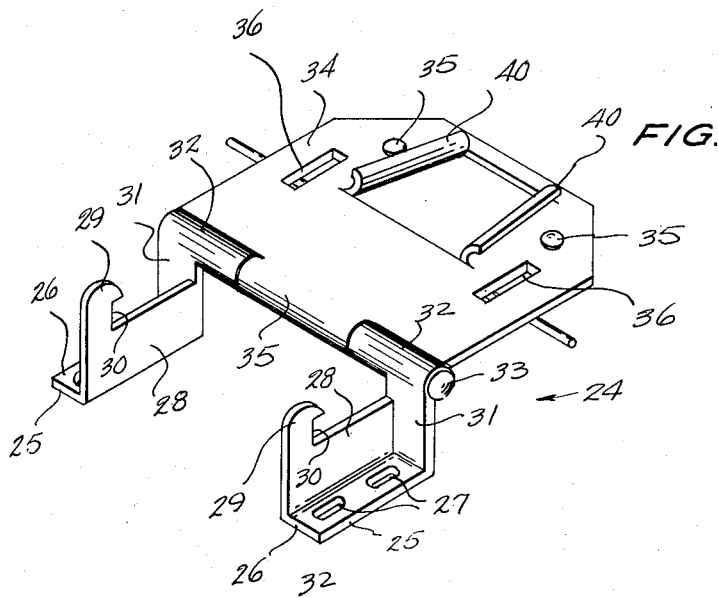
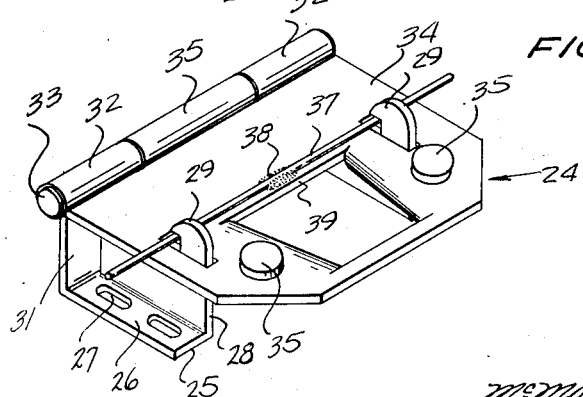
INVENTOR.
BRUNO CERESA,
BY
McMorrow, Berman + Davidson
ATTORNEYS.

Patented July 20, 1954

2,684,265

UNITED STATES PATENT OFFICE 2,684,265

AUTOMOBILE TRUNK VENTILATING DEVICE

Bruno Ceresa, Detroit, Mich.

Application August 8, 1952, Serial No. 303,299

2 Claims. (Cl. 296—76)

This invention relates to ventilating devices for automobile trunk compartments, and more particularly to an improved supporting means for supporting the hinged trunk deck of an automobile body in an open position to provide ventilation of the trunk compartment.

The main object of the invention is to provide a novel and improved supporting device for holding the hinged trunk deck of an automobile body in an open position to provide ventilation of the interior of the trunk compartment, enabling the compartment to be employed for the transportation of live animals, pets, or other objects requiring free circulation of air in the trunk compartment, the improved device being simple in construction, being easy to install, and being foldable to an out-of-the-way position when its use is not required.

A further object of the invention is to provide an improved supporting device for holding the hinged trunk deck of an automobile body in an open position to provide ventilation in the trunk compartment, the supporting device involving inexpensive components, being durable in construction, and being arranged to support the hinged deck in a partially open position while securing said deck from becoming fully opened.

Further objects and advantages of the invention will become apparent from the following description and claims, and from the accompanying drawings, wherein:

Figure 3 is an enlarged vertical cross sectional view taken on the line 3—3 of Figure 1, showing the deck-supporting device in its operative position whereby the hinged deck is supported in a partly open position.

Figure 4 is an enlarged perspective view of the deck-supporting device employed in Figures 1 to 3, the device being shown in the inoperative position thereof illustrated in Figure 2.

Figure 5 is a perspective view of the trunk deck-supporting device of Figure 4 showing the device arranged in its operative position, illustrated in Figure 3.

Figure 1:
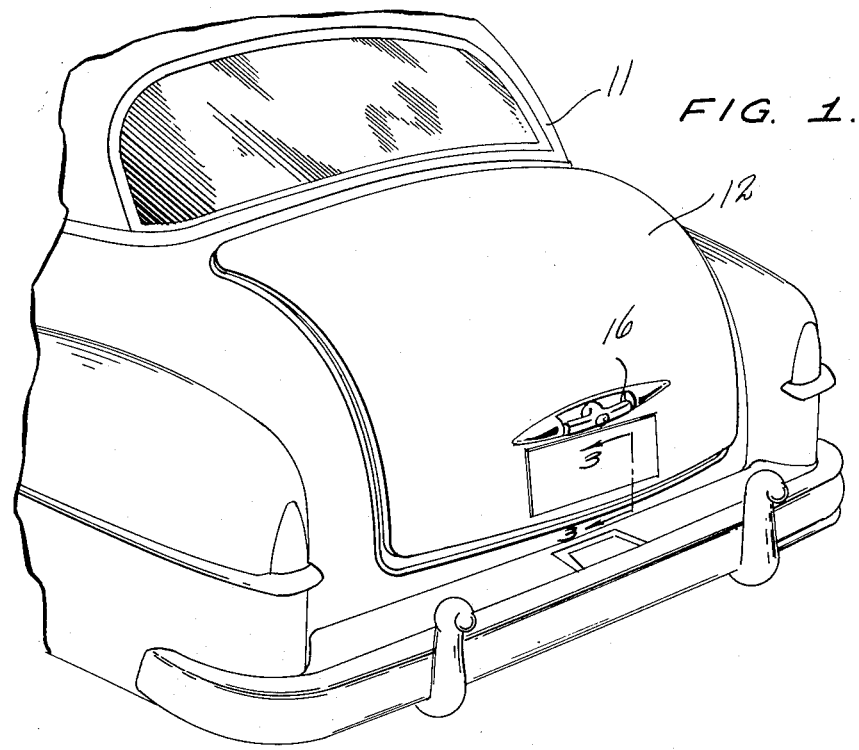
Figure 1 is a fragmentary perspective view of the rear portion of an automobile showing the hinged trunk deck thereof supported in a partly open position by means of an improved deck-supporting device constructed in accordance with the present invention.

Referring to the drawings, 11 designates a conventional automobile body having the hinged trunk deck 12 which is arranged to cover the trunk compartment 13. The trunk deck 12 includes the bolt housing 14 which is rigidly secured to the inside surface of the deck and in which the movable locking bolt 15 is positioned, said locking bolt being controlled by the handle 16 which, in turn, may be locked or unlocked by means of the usual key-operated mechanism. The bottom wall 17 of the trunk compartment 13 includes the respective successive downwardly offset portions 18 and 19, the offset portion 19 having secured thereto conventional bolt-receiving bracket means 20 formed with the keeper recess 21 in which the end of the bolt 15 is lockingly engageable to secure the deck 12 in its closed position. The marginal portion of deck 12 is formed with a rim 22 which is engageable sealingly against the conventional rim gasket 23 provided in the marginal rim portion of the trunk compartment 13.

Generally designated at 24 is a trunk deck-supporting device which comprises a pair of spaced parallel brackets 25, 25 secured to the offset portion 19 of the trunk compartment floor on opposite sides of the bolt-receiving bracket 20. Each bracket 25 is formed with the base flange 26 having the slots 27 through which suitable fasteners may be engaged for securing the brackets to the downwardly offset trunk compartment floor portion 19. Extending upwardly from the inner edges of the flanges 26 are the respective vertical flanges 28 which are formed at their rear ends with the upwardly extending hook elements 29 defining rectangular locking notches 30, 30 as is clearly illustrated in Figure 4. At the ends of the brackets 25 are the respective upstanding wall portions 31 which are formed at their top ends with the aligned transverse sleeve elements 32, 32 through which extends the hinge rod 33. Designated at 34 is a plate member formed with the hinged sleeve 35 which is rotatably mounted on the hinge rod 33 between the sleeve elements 32, 32, whereby the plate member 34 is hinged to the brackets 25, 25 for swinging movement around a transverse horizontal axis. The plate member 34 may be swung to an inoperative position, as shown in Figure 2, wherein said plate member is supported on the main portion of the floor of the trunk compartment, respective resilient bumpers 35, 35 of deformable resilient material, such as rubber or the like, being provided at the free end portion of the plate member to support said plate member on the trunk compartment floor.

As shown in Figure 3, the plate member 34 may be swung to an operative position underlying the bolt housing 14. The plate member 34 is formed with the respective slots 36, 36 at its opposite sides adapted to receive the hook elements 29, 29. Secured at its intermediate portion to the plate member and transversely overlying the end portions of said slots is a rod member 37 of spring metal, said rod member being preferably welded to the intermediate portion of the plate member 34, as shown at 38. The free end portions of the transversely extending rod member 37 are lockingly engageable with the hook elements 29, 29 and are arranged to snap into locking positions in the locking notches 30, 39 when the plate member 34 is swung to the position thereof shown in Figure 5. The resilient free end portions of the rod member 37 thus serve to lock the plate member 34 in its operative position, shown in Figure 3, although the end portions of the rod 37 may be flexed away from the locking notches 39 manually when it is desired to raise the plate member 34 from the position thereof shown in Figure 3 and to rotate said plate member to the inoperative position thereof shown in Figure 2.

The plate member 34 is formed with the generally trapezoidal aperture 39 between the bumpers 35, 35, said aperture being formed with the curved side flanges 40, 40 which extend downwardly from the plate member 34 when said plate member is arranged in the position thereof shown in Figures 3 and 5. The aperture 39 is arranged to receive the locking bolt 15 and takes the place of the bolt-receiving bracket 20 to secure the trunk deck 12 in its partly opened ventilating position, shown in Figure 3. As will be apparent from Figure 3, the deck 12 is securely supported in a partly open position wherein the edge of the deck is separated from the rim of the trunk compartment by a sufficient distance to allow free ventilation of the interior of the trunk compartment. At the same time, the deck 12 is securely locked against upward swinging movement and is held in its partly open position by the engagement of the locking bolt 15 with the bolt-receiving aperture 39.

Figure 2:
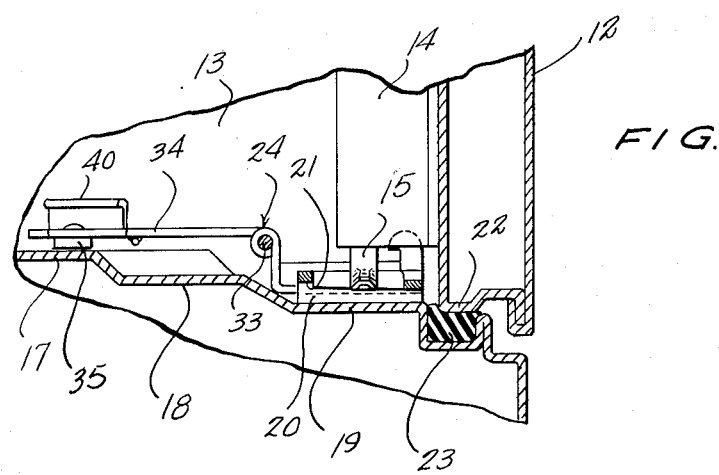
Figure 2 is an enlarged vertical cross sectional view taken through the marginal portion of the hinged deck of the automobile and through the marginal portion of the trunk compartment adjacent thereto with the deck-supporting device arranged in an inoperative position, whereby the trunk deck is held closed against the margin of the trunk compartment in the normal manner.

When ventilation of the trunk compartment is not required, the plate member 34 may be released, in the manner above described, and may be swung to the inoperative position thereof shown in Figure 2, whereupon the trunk deck 12 may be locked in fully closed position, as shown in Figure 2.

It will be noted from Figure 3 that when the trunk deck-supporting device is in the position wherein it underlies the bolt housing 14, the resilient bumpers 35 are arranged to engage the bottom surface of the housing and to prevent looseness between the plate member 34 and said housing bottom surface. Thus, the bumpers 35 serve to prevent rattling and to prevent free movement of the deck 12 relative to the plate member 34, since said plate member is securely locked in position by the engagement of the resilient rod 37 with the hook elements 29, 29. The locking engagement of the bolt 15 in the aperture 39 causes the bottom surface of the bolt housing 14 to be held against the bumpers 35 and thus prevents undesired movement of the deck 12 relative to the supporting device 24.

While a specific embodiment of an improved ventilating device for supporting the hinged trunk deck of an automobile body in a partly open position has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for supporting the hinged trunk deck of an automobile body in an open position comprising bracket means adapted to be secured in the trunk compartment adjacent the lower margin of the deck, a plate member hinged to said bracket means on a transverse horizontal axis for swinging movement to a position substantially underlying the marginal portion of the deck, and interengaging locking means carried by said plate member and bracket means for securing said plate member in said position, said locking means comprising an upstanding hook element on said bracket means engageable through said plate member, and a resilient transverse horizontal rod carried by said plate member and lockingly engageable with said hook element.

2. A device for supporting the hinged trunk deck of an automobile body in an open position comprising bracket means adapted to be secured in the trunk compartment adjacent the lower margin of the deck, a plate member hinged to said bracket means on a transverse horizontal axis for swinging movement to a position substantially underlying the marginal portion of the deck, and interengaging locking means carried by said plate member and bracket means for securing said plate member in said position, said plate member being formed with an aperture adapted to receive the locking bolt of the hinged deck and being formed with a pair of slots on opposite sides of the aperture, said locking means comprising a pair of upstanding hook elements on said bracket means engageable through said slots, and a resilient transverse horizontal rod secured centrally on said plate member and being lockingly engageable with said hook elements.

References Cited in the file of this patent

UNITED STATES PATENTS

| Number | Name | Date |
| --- | --- | --- |
| 630,898 | Kneisly | Aug. 15, 1899 |
| 1,010,482 | Crowe | Dec. 5, 1911 |
| 2,097,911 | Becker | Nov. 2, 1937 |
| 2,618,497 | Gardels | Nov. 18, 1952 |